(12) United States Patent
Qiu et al.

(10) Patent No.: US 8,338,071 B2
(45) Date of Patent: Dec. 25, 2012

(54) PROCESSES FOR PRODUCING POLYESTER LATEXES VIA SINGLE-SOLVENT-BASED EMULSIFICATION

(75) Inventors: Shigang S. Qiu, Toronto (CA); David R. Kurceba, Hamilton (CA); Zhaoyang Ou, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 12 days.

(21) Appl. No.: 12/784,802

(22) Filed: May 21, 2010

(65) Prior Publication Data

US 2011/0281216 A1    Nov. 17, 2011

Related U.S. Application Data

(63) Continuation-in-part of application No. 12/778,431, filed on May 12, 2010.

(51) Int. Cl.
G03G 9/08    (2006.01)

(52) U.S. Cl. ............ 430/137.17; 430/137.1; 430/137.11

(58) Field of Classification Search ............... 430/137.1, 430/137.11, 137.17
See application file for complete search history.

(56) References Cited

U.S. PATENT DOCUMENTS

| | | |
|---|---|---|
| 3,590,000 A | 6/1971 | Palermiti et al. |
| 3,800,588 A | 4/1974 | Larson et al. |
| 3,933,954 A | 1/1976 | Gebhard et al. |
| 4,056,653 A | 11/1977 | Gebhard et al. |
| 4,298,672 A | 11/1981 | Lu |
| 4,338,390 A | 7/1982 | Lu |
| 5,278,020 A | 1/1994 | Grushkin et al. |
| 5,290,654 A | 3/1994 | Sacripante et al. |
| 5,302,486 A | 4/1994 | Patel et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,354,804 A | 10/1994 | Inada et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,399,597 A | 3/1995 | Mandel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,548,004 A | 8/1996 | Mandel et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |

(Continued)

FOREIGN PATENT DOCUMENTS

WO    WO 98/45356    10/1998

(Continued)

*Primary Examiner* — Peter Vajda (74) *Attorney, Agent, or Firm* — MDIP LLC (57) ABSTRACT

A process for making a latex emulsion suitable for use in a toner composition includes contacting at least one crystalline polyester resin with an organic solvent to form a resin mixture, adding a neutralizing agent, and deionized water to the resin mixture, removing the solvent from the formed latex, and continuously recovering latex particles.

20 Claims, 2 Drawing Sheets

U.S. PATENT DOCUMENTS

| | | | |
|---|---|---|---|
| 5,747,215 A | 5/1998 | Ong et al. | |
| 5,763,130 A * | 6/1998 | Sasaki et al. | 430/110.2 |
| 5,763,133 A | 6/1998 | Ong et al. | |
| 5,766,818 A | 6/1998 | Smith et al. | |
| 5,804,349 A | 9/1998 | Ong et al. | |
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,863,698 A | 1/1999 | Patel et al. | |
| 5,869,215 A | 2/1999 | Ong et al. | |
| 5,902,710 A | 5/1999 | Ong et al. | |
| 5,910,387 A | 6/1999 | Mychajlowskij et al. | |
| 5,916,725 A | 6/1999 | Patel et al. | |
| 5,919,595 A | 7/1999 | Mychajlowskij et al. | |
| 5,925,488 A | 7/1999 | Patel et al. | |
| 5,977,210 A | 11/1999 | Patel et al. | |
| 5,994,020 A | 11/1999 | Patel et al. | |
| 6,063,827 A | 5/2000 | Sacripante et al. | |
| 6,080,807 A | 6/2000 | Campbell | |
| 6,214,507 B1 | 4/2001 | Sokol et al. | |
| 6,512,024 B1 | 1/2003 | Lundgard et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 7,029,817 B2 * | 4/2006 | Robinson et al. | 430/137.14 |
| 7,064,156 B2 | 6/2006 | Rink et al. | |
| 7,385,001 B2 | 6/2008 | Shim et al. | |
| 2002/0074681 A1 | 6/2002 | Lundgard et al. | |
| 2005/0074685 A1* | 4/2005 | Kido et al. | 430/110.2 |
| 2006/0222991 A1 | 10/2006 | Sacripante et al. | |
| 2008/0107989 A1* | 5/2008 | Sacripante et al. | 430/109.4 |
| 2008/0153027 A1 | 6/2008 | Veregin et al. | |
| 2009/0208864 A1 | 8/2009 | Zhou et al. | |
| 2009/0246680 A1 | 10/2009 | Chung et al. | |

FOREIGN PATENT DOCUMENTS

WO    WO 00/17256    3/2000

\* cited by examiner

PROCESSES FOR PRODUCING POLYESTER LATEXES VIA SINGLE-SOLVENT-BASED EMULSIFICATION

RELATED APPLICATIONS

This application is a continuation-in-part of co-pending U.S. patent application Ser. No. 12/778,431, filed on May 12, 2010, the disclosure of which is hereby incorporated by reference in its entirety.

TECHNICAL FIELD

The present disclosure relates to processes for producing resin emulsions useful in producing toners. More specifically, more efficient solvent-based processes are provided for emulsifying crystalline polyester resins.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners have been prepared utilizing amorphous and crystalline polyester resins as illustrated, for example, in U.S. Patent Application Publication No. 2008/0153027, the disclosure of which is hereby incorporated by reference in its entirety. The incorporation of these polyesters into the toner requires that they first be formulated into emulsions prepared by solvent containing batch processes, for example solvent flash emulsification and/or solvent-based phase inversion emulsification (PIE), which is both time and energy-consuming. In both cases, large amounts of organic solvents, such as ketones or alcohols, have been used to dissolve the resins, which may require subsequent energy intensive distillation to form the latexes.

Solventless latex emulsions have been formed in either a batch or extrusion process through the addition of a neutralizing solution, a surfactant solution and water to a thermally softened resin as illustrated, for example, in U.S. Patent Application Publication Nos. 2009/0208864 and 2009/0246680, the disclosures of each of which are hereby incorporated by reference in their entirety. However, certain resins may be difficult to process without the use of a solvent in that they do not exhibit a sharp melting point and even at 100° C., exhibit substantial viscosities which may work against the formation of emulsions. In addition, certain resins are more susceptible to molecular weight degradation in the solvent-free process on account of their composition.

Thus, it would be advantageous to provide a more efficient solvent-based process for the preparation of a polymer latex, particularly latexes formed from crystalline resins, suitable for use in a toner product that has a high product yield with optimal particle size distribution.

SUMMARY

Processes of the present disclosure include contacting at least one crystalline polyester resin with an organic solvent wherein the ratio of solvent to resin is from about 0.1:10 to about 20:10; melt mixing the mixture; contacting the melt mixed mixture with a neutralizing agent; contacting the neutralized mixture with de-ionized water to form an emulsion; and continuously recovering latex particles.

A process includes contacting at least one crystalline polyester resin with an organic solvent to form a resin mixture, wherein the organic solvent is selected from the group consisting of isopropanol, methanol, ethanol, 1-butanol, 2-butanol, isobutanol, tert-butanol, and combinations thereof and wherein the organic solvent to resin ratio is from about 0.1:10 to about 20:10; melt mixing the mixture; contacting the melt mixed mixture with a neutralizing agent; contacting the neutralized mixture with de-ionized water to form an emulsion; continuously recovering latex particles from the emulsion; contacting the latex particles with an optional colorant, an optional wax, and an amorphous polyester resin to form toner particles.

Processes of the present disclosure also include contacting at least one crystalline polyester resin with an organic solvent to form a resin mixture, wherein the organic solvent is selected from the group consisting of isopropanol, methanol, ethanol, 1-butanol, 2-butanol, isobutanol, tert-butanol, and combinations thereof; contacting at least one crystalline polyester resin with a recycled organic solvent from a previous emulsification process to form a resin mixture; melt mixing the mixture; contacting the melt mixed mixture with a neutralizing agent; contacting the neutralized mixture with de-ionized water to form an emulsion; recovering the organic solvent from the resin mixture; continuously recovering latex particles from the emulsion; and contacting the latex particles with an optional colorant, an optional wax, an optional additive, and an amorphous polyester resin to form toner particles.

BRIEF DESCRIPTION OF DRAWINGS

Various embodiments of the present disclosure will be described herein below with reference to the figures wherein.

DETAILED DESCRIPTION

The present disclosure provides solvent based processes for forming high yield polyester latexes which may be utilized in forming a toner.

The addition of at least two solvents, in embodiments methyl ethyl ketone (MEK) and isopropanol (IPA), to a crystalline polyester resin allows the crystalline polyester resin to be emulsified in a solvent process. Without the solvents, the crystalline resin does not emulsify under the same solvent-free experimental conditions. Solvents are added to permit the necessary reorientation of chain ends to stabilize and form particles which lead to the formation of stable latexes without surfactant. The use of two solvents however makes difficult the recycling of the solvents and adds greatly to the cost of processing and distillation time.

A recyclable single solvent PIE process for use with crystalline resins that simplifies the separation and recycling of the solvent to reduce the cost of the process and the distillation time is therefore desirable.

In accordance with the present disclosure, a new formulation and process for the emulsification of crystalline polyester resins using a single solvent system and for recovering and recycling the solvent for a subsequent PIE is provided. In embodiments, the process and formulation therefore limit the amount of solvent waste generated in the PIE process by at least about 50%.

In embodiments, the present disclosure provides a process which includes contacting at least one crystalline polyester resin with an organic solvent, wherein the ratio of organic solvent to the resin is about 0.1 to about 10; melt mixing the mixture; contacting the melt mixed mixture with a neutralizing agent; contacting the neutralized mixture with de-ionized water to form an emulsion; and continuously recovering latex particles.

In embodiments, the present disclosure provides a process which includes contacting at least one crystalline polyester resin with an organic solvent to form a resin mixture wherein the organic solvent may be isopropanol, methanol, ethanol, 1-butanol, 2-butanol, isobutanol, tert-butanol, and combinations thereof; melt mixing the mixture; contacting the melt mixed mixture with a neutralizing agent; contacting the neutralized mixture with de-ionized water to form an oil in water emulsion; continuously recovering latex particles; contacting the latex particles with an optional colorant, an optional wax, and an amorphous polyester resin to form a shell over the latex particles, thereby forming toner particles.

In embodiments, the present disclosure provides a process which includes contacting at least one crystalline polyester resin with a recycled organic solvent from a previous emulsification process to form a resin mixture, wherein the organic solvent may be isopropanol, methanol, ethanol, 1-butanol, 2-butanol, isobutanol, tert-butanol, and combinations thereof; melt mixing the mixture; contacting the melt mixed mixture with a neutralizing agent; contacting the neutralized mixture with de-ionized water to form an oil in water emulsion; recovering the organic solvent from the resin mixture; continuously recovering latex particles; contacting the latex particles with an optional colorant, an optional wax, and an amorphous polyester resin to form a shell over the latex particles, thereby forming toner particles.

In embodiments, the present disclosure provides a high yield toner which includes at least one crystalline polyester resin; a recycled organic solvent, wherein the recycled organic solvent is optionally salted out; a neutralizing agent; de-ionized water; and an optional colorant with optional toner additives.

Resins

Any resin may be utilized in forming a latex emulsion of the present disclosure. In embodiments, the resins may be an amorphous resin, a crystalline resin, and/or a combination thereof. In embodiments, the resin may be a crystalline polyester resin with acidic groups having an acid number of about 1 mg KOH/g polymer to about 200 mg KOH/g polymer, in embodiments from about 5 mg KOH/g polymer to about 50 mg KOH/g polymer. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), polypropylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, North Carolina, and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 5 to about 95 percent by weight of the toner components, in embodiments from about 30 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Solvent

Any suitable organic solvent may be used to dissolve the resin, for example, alcohols, esters, ethers, ketones, amines, and combinations thereof, in an amount of, for example, from about 0.1% by weight to about 100% by weight of the resin, in embodiments of from about 2% by weight to about 50% by weight of the resin, in other embodiments of from about 5% by weight to about 35% by weight of the resin.

In embodiments, the solvent to resin ratio may be about 0.1:10 to about 20:10, in other embodiments, from about 1.0:10 to about 5:10.

In embodiments, suitable organic solvents, sometimes referred to, in embodiments, as phase inversion agents, include, for example, methanol, ethanol, propanol, isopropanol, 1-butanol, 2-butanol, tert-butanol, ethyl acetate, methyl ethyl ketone, and combinations thereof. In embodiments, the organic solvent may be isopropanol. In embodiments, the organic solvent may be immiscible in water and may have a boiling point of from about 30° C. to about 150° C.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

In embodiments, an emulsion formed in accordance with the present disclosure may also include a small quantity of water, in embodiments, de-ionized water (DIW), in amounts of from about 30% to about 95%, in embodiments, of from about 30% to about 60%, at temperatures that melt or soften the resin, of from about 20° C. to about 120° C., in embodiments from about 30° C. to about 100° C.

The basic agent may be utilized in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous solution. In other embodiments, the neutralizing agent may be added in the form of a solid.

Utilizing the above basic neutralization agent in combination with a resin possessing acid groups, a neutralization ratio of from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may optionally include adding a surfactant, before or during the melt mixing, to the resin at an elevated temperature. In embodiments, the surfactant may be added prior to melt-mixing the resin at an elevated temperature.

Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process includes melt mixing a mixture at an elevated temperature containing at least one crystalline resin, an organic solvent, optionally a surfactant, and a neutralizing agent, wherein the organic solvent utilized in the process may be recycled for subsequent use, and/or wherein the organic solvent utilized is a recycled organic solvent from a previous emulsification process, to form a latex emulsion. In embodiments, the resins may be pre-blended prior to melt mixing.

More than one resin may be utilized in forming the latex. As noted above, the resin may be a crystalline resin. In embodiments, the resin may be a crystalline resin and the elevated temperature may be a temperature above the crystallization temperature of the crystalline resin. In further embodiments, the resin may be a mixture of amorphous and crystalline resins and the temperature may be above the glass transition temperature of the mixture.

Thus, in embodiments, a process of the present disclosure may include contacting at least one resin with an organic solvent to form a resin mixture, heating the resin mixture to an elevated temperature, stirring the mixture, adding a neutralizing agent to neutralize the acid groups of the resin, adding water dropwise into the mixture until phase inversion occurs to form a phase inversed latex emulsion, distilling the latex to remove from it a water solvent mixture in the distillate and producing a high quality latex, separating the solvent from the water in the distillate, optionally adding salt to the water phase to extract further water from the organic phase, and reusing the recovered organic solvent phase in a second phase inversion emulsification. In embodiments, a recycled organic solvent, which has optionally been salted out, is utilized to replace about 75% to about 100% of the organic solvent in the PIE process. In the phase inversion process, the crystalline polyester resins may be dissolved in a low boiling organic solvent, which solvent is miscible in water, such as isopropanol, or any other solvent noted hereinabove, at a concentration of from about 1% by weight to about 99% by weight resin in solvent, in embodiments from about 50% by weight to about 85% by weight resin in solvent. In embodiments, the organic solvent to resin ratio may be from about 0.1:10 to about 20:10, in embodiments of from about 1:10 to about 5:10. The resin mixture is then heated to a temperature of from about 25° C. to about 90° C., in embodiments from about 30° C. to about 85°C. The heating need not be held at a constant temperature, but may be varied. For example, the heating may be slowly or incrementally increased until a desired temperature is achieved.

In accordance with previous prior art processes, a crystalline and/or an amorphous polyester latex may be obtained using a two solvent PIE process which requires dispersing and solvent stripping steps. In this process, the polyester resin may be dissolved in a combination of two organic solvents, for example, MEK and IPA, to produce a homogenous organic phase. A fixed amount of base solution (such as ammonium hydroxide) is then added into this organic phase to neutralize acid end groups on the polyester chain, followed by the addition of de-ionized water (DIW) to form a uniform dispersion of polyester particles in water through phase inversion. The organic solvents remain in both the polyester particles and water phase at this stage. Through vacuum distillation, the solvents are stripped off. The distillate obtained contains a mixture of MEK/IPA/DIW which results in a challenging co-solvent recovery problem. The separation and recycling of this mixture may be difficult and it may be costly to dispose of the distillate. In this two-solvent PIE process, a solvent to resin (MEK+IPA) ratio of about 7 to about 10 is utilized.

In accordance with the present disclosure, a single solvent may be used to form the latex. Table 1 compares the conventional process to the single solvent system disclosed herein (referred to herein as a "Single Solvent PIE process").

TABLE 1

Comparison of two formulations and cost

|  | Conventional PIE Process | Single Solvent PIE Process | Single Solvent PIE Process |
|---|---|---|---|
| PIE Formulation |  |  |  |
| Crystalline Resin (kg) | 10.0 | 10.0 | 10.0 |
| MEK (kg) | 6.0 | 0 | 0 |
| IPA (kg) | 1.25 | 4.0 | 3.2 |
| Solvent Balance |  |  |  |
| Total Solvent Req'd (kg) | 7.25 | 4.0 | 3.2 |
| Cost of Solvent ($/kg resin) | 1.43 | .74 | .59 |
| Cost Saving |  | −46.6% | −57.3% |
| Yield Increased |  | +7.14 | +9.29 |

In embodiments, the neutralizing agent which may be utilized in the process of the present disclosure includes the agents mentioned hereinabove. In embodiments, the optional surfactant utilized may be any of the surfactants mentioned hereinabove to ensure that proper resin neutralization occurs and leads to a high quality latex with low coarse content.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent. In embodiments, a surfactant may be added to the pre-blend mixture prior to melt mixing.

The melt-mixing temperature may be from about 25° C. to about 100° C., in embodiments from about 50° C. to about 90° C., in other embodiments from about 55° C. to about 80° C.

Once the resins, neutralizing agent and optional surfactant are melt mixed, the mixture may then be contacted with water, to form a latex emulsion. Water may be added in order to form a latex with a solids content of from about 5% to about 50%, in embodiments, of from about 10% to about 45%. While higher water temperatures may accelerate the dissolution process, latexes can be formed at temperatures as low as room temperature. In other embodiments, water temperatures may be from about 40° C. to about 110° C., in embodiments, from about 50° C. to about 90° C.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including the surfactant and/or water composition.

Melt mixing may be conducted, in embodiments, utilizing any means within the purview of those skilled in the art. For example, melt mixing may be conducted in a glass kettle with an anchor blade impeller, an extruder, i.e. a twin screw extruder, a kneader such as a Haake mixer, a batch reactor, or any other device capable of intimately mixing viscous materials to create near homogenous mixtures.

Stirring, although not necessary, may be utilized to enhance formation of the latex. Any suitable stirring device may be utilized. In embodiments, the stirring may be at a speed of from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the heating of the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, the temperature of heating, the stirring speed, and the like, phase inversion may occur when the basic neutralization agent, optional surfactant, and/or water has been added so that the resulting resin is present in an amount from about 5% by weight to about 70% by weight of the emulsion, in embodiments from about 20% by weight to about 65% by weight of the emulsion, in other embodiments from about 30% by weight to about 60% by weight of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature, for example from about 20° C. to about 25° C.

In embodiments, distillation with stirring of the organic solvent may be performed to provide resin emulsion particles with an average diameter size of, for example, from about 50 nm to about 500 nm, in embodiments from about 120 nm to about 250 nm. As noted above, the distillate from the present disclosure can be utilized and/or recycled for use in a subsequent phase inversion emulsification process.

In embodiments, for example, the distillate from the process of the present disclosure may contain isopropanol (IPA) and water. In embodiments, the IPA-water mixture separation may be enhanced by a process called salt effect distillation. In this process, a salt (such as, for example, sodium chloride) may be added to extract water out of the organic phase and into the aqueous phase thus decreasing the equilibrium solubility of water in the organic phase.

In embodiments, the present disclosure provides a formulation and process for a single solvent phase inversion emulsification of a crystalline polyester resin into latex, the recovery of the solvent from the latex and the reuse or recycling of the solvent. The process and formulation include the steps of: dissolution of the resin at a certain temperature in a single solvent (such as IPA), and neutralization of acid groups by adding an aqueous solution of base to the above resin solution, and emulsification by adding the preheated or room temperature de-ionized water to the above mixture, followed by removal of the solvents by a vacuum distillation stage, separation of the solvent from the aqueous phase in the distillate through gravity separation methods, and repeating of the above steps with the recycled solvent.

The desired properties of the crystalline polyester emulsion (i.e. particle size and low residual solvent level) can be achieved by adjusting the solvent and neutralizer concentration and process parameters (i.e. reactor temperature, vacuum, and process time).

The process of the present disclosure for the production of polyester latex emulsions using PIE eliminates or minimizes wasted product and facilitates solvent recycling on account of only one solvent used in the process.

The emulsified resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of water to resin, the neutralization ratio, solvent concentration, and solvent composition.

Particle size distribution of a latex of the present disclosure may be from about 30 nm to about 500 nm, in embodiments, from about 125 nm to about 400 nm.

The coarse content of the latex of the present disclosure may be from about 0.01% by weight to about 5% by weight, in embodiments, from about 0.1% by weight to about 3% by weight. The solids content of the latex of the present disclosure may be from about 10% by weight to about 50% by weight, in embodiments, from about 20% by weight to about 40% by weight.

The process of the present disclosure for the production of polyester latex emulsions using PIE eliminates or minimizes wasted product and produces latexes with more efficient solvent stripping, solvent recovery, and permits recycling of the solvent.

The latex emulsions of the present disclosure may then be utilized to produce particles that are suitable for emulsion aggregation ultra low melt processes, using crystalline polyester resins.

Toner

Once the resin mixture has been contacted with water to form an emulsion and the solvent removed from this mixture as described above, the resulting latex may then be utilized to form a toner by any method within the purview of those skilled in the art. The latex emulsion may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after melt mixing the resin to form the latex emulsion of the present disclosure. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600x and GHD 6004X (Pigment Green 7 74260), Sunsperse QHD 6040X (Pigment Red 122 73915), Sunsperse RHD 9668X (Pigment Red 185 12516), Sunsperse RHD 9365x and 9504X (Pigment Red 57 15850:1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be of from about 2 μm to about 12 μm, in embodiments of from about 3 μm to about 10 μm.

Shell Resin

In embodiments, after aggregation, but prior to coalescence, a resin coating may be applied to the aggregated particles to form a shell thereover. In embodiments, the core may thus include a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, optionally the solvent based crystalline polyester resin latex neutralized with NaOH described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

The shell may be present in an amount of from about 1 percent by weight to about 80 percent by weight of the latex particles, in embodiments of from about 10 percent by weight to about 40 percent by weight of the latex particles, in still further embodiments from about 20 percent by weight to about 35 percent by weight of the latex particles.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 1000 rpm to about 100 rpm, in embodiments from about 800 rpm to about 200 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried.

Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Solvent-based emulsification of a crystalline polyester resin. A 1 liter glass kettle was charged with about 80 grams of isopropanol (IPA) and about 200 grams of a crystalline polyester resin with an acid value (AV) of about 9.8 mg KOH/g polymer. The ratio of IPA to resin was about 4:10. The glass kettle was placed inside a water bath set at about 76° C. with its cover on, a gasket, a condenser, and an anchor blade impeller for stirring.

About 500 grams of de-ionized water was heated on a hot plate to a temperature of about 85° C. The resin was heated to about 71.5° C. with stirring at about 60 rpm. The mixture was left to stir for about 75 minutes. Once the resin was melted/dissolved, the bath temperature was decreased to about 65° C. and about 16 grams of 10% $NH_4OH$ solution (calculated as 10% $NH_3$) (neutralization ratio of about 269%) was added to the mixture drop-wise with a disposable pipette through a rubber stopper during a period of about 2 minutes.

Figure 1:
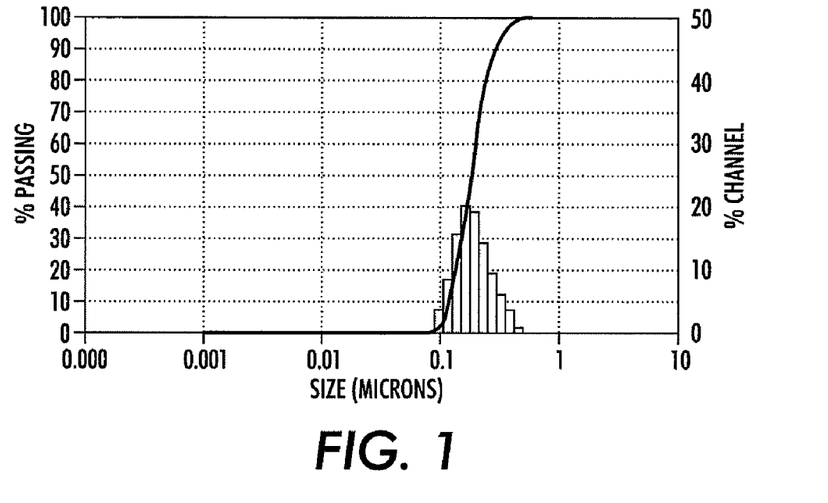
FIG. 1 is a graph depicting particle size distribution for the latex produced in accordance with Example 1 of the present disclosure.

The mixture was left to stir for about 16 minutes. Thereafter, about 400 grams of pre-heated de-ionized water (DIW) was pumped into the kettle at a flow rate of about 4.4 grams/minute over about 90 minutes. The emulsion produced had a particle size of about 176 nm (see FIG. 1) as measured using a Nanotrac particle size analyzer. The emulsion/solvent solution was poured into a glass pan and kept in a fume hood and stirred by a magnetic stir-bar to evaporate the solvent for about 48 hours.

Example 2

Single solvent-based emulsification of a crystalline polyester resin as in Example 1 scaled up using a 5 gallon scale. About 3 kilograms of a crystalline resin with an AV of about 11.6 and about 1.2 kilograms of IPA were charged into a 5 gallon reactor. The jacketed reactor was heated with hot oil heating system set at about 76° C. with a condenser and an anchor blade impeller for stirring.

The resin was heated to about 71.5° C. with stirring at about 60 rpm. The mixture was left to stir for about 90 minutes. Once the resin was melted/dissolved, the jacket temperature was decreased to about 67° C. and about 283.8 grams of 10% $NH_4OH$ solution (calculated as 10% $NH_3$) (neutralization ratio of about 269%) was added to the mixture through a charge port for a period of about 2 minutes.

The mixture was left to stir for about 10 minutes. Thereafter, about 6 kilograms of pre-heated DIW (about 65° C.) was metered into the reactor at a flow rate of about 1.1 grams/second over about 90 minutes. The last 6 kilograms of pre-heated DIW (about 65° C.) was metered into the reactor at a flow rate of about 6.7 grams/second over about 15 minutes. A phase inversed latex with a solids content of about 18.5% and a pH of about 10 was formed.

Figure 2:
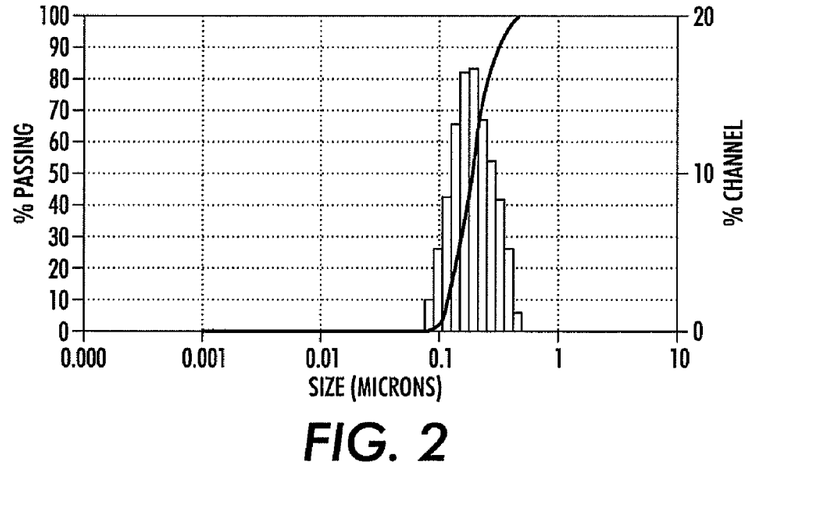
FIG. 2 is a graph depicting particle size distribution for the latex produced in accordance with Example 2 of the present disclosure.

The reactor was then vented by take-off condenser in order to distill the solvent containing latex. The reactor was set to about 54° C., and a reactor vacuum was gradually applied with the aid of a nitrogen sweep to facilitate evaporation of the solvent. The reactor temperature was then dropped to about 20° C. and the target residual solvent level reached about 125 ppm in about 3 hours. About 6.5 kilograms of distillate and about 9 kilograms of latex were obtained. The emulsion produced had a particle size of about 182 nm (see FIG. 2) as measured using a Nanotrac particle size analyzer, a solids content of about 31.79%, and a pH of about 8.1.

Example 3

Single solvent-based emulsification of a crystalline polyester resin as in Example 1 scaled up using a 5 gallon scale with a lower solvent ratio. About 3.5 kilograms of a crystalline resin with an AV of about 11.6 and about 0.98 kilograms of IPA were charged into a 5 gallon reactor at a ratio of about 10:2.8. The jacketed reactor was heated with hot oil heating system set at about 75° C. with a condenser and an anchor blade impeller for stirring.

The resin was heated to about 71.5° C. with stirring at about 80 rpm. The mixture was left to stir for about 278 minutes. Once the resin was melted/dissolved, the jacket temperature was decreased to about 67° C. and about 273 grams of 10% $NH_4OH$ solution (calculated as 10% $NH_3$) (neutralization ratio of about 222%) was added to the mixture through a charge port during a period of about 2 minutes.

The mixture was left to stir for about 10 minutes. Thereafter, about 7.5 kilograms of pre-heated DIW was metered into the reactor at a flow rate of about 1.3 grams/second over about 90 minutes. The last 7.5 kilograms of pre-heated DIW was metered into the reactor at a flow rate of about 7.8 grams/second over about 15 minutes.

Figure 3:
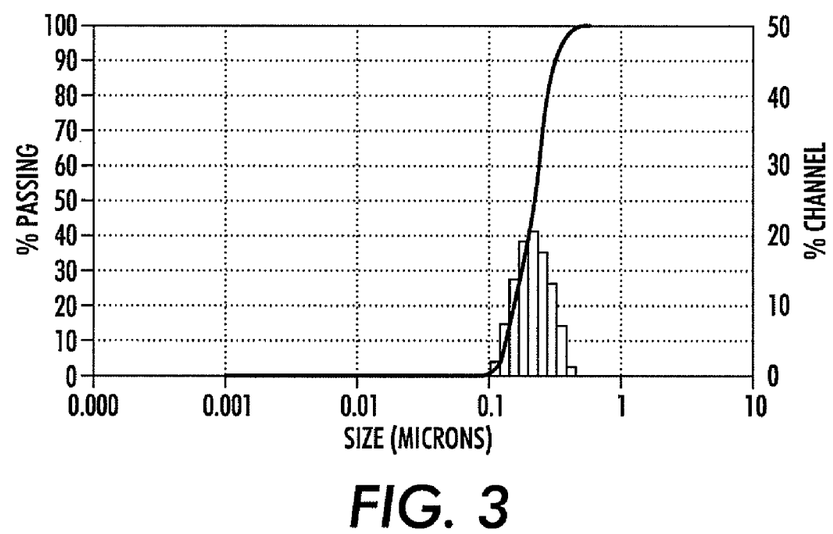
FIG. 3 is a graph depicting particle size distribution for the latex produced in accordance with Example 3 of the present disclosure.

The emulsion produced had a particle size of about 219.6 nm (see FIG. 3) as measured using a Nanotrac particle size analyzer.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
    contacting at least one crystalline polyester resin with an organic solvent wherein the ratio of solvent to resin is from about 0.1:10 to about 20:10;
    melt mixing the mixture;
    contacting the melt mixed mixture with a neutralizing agent;
    contacting the neutralized mixture with de-ionized water to form an emulsion; and
    continuously recovering latex particles.

2. The process according to claim 1, wherein the organic solvent is selected from the group consisting of esters, ethers, ketones, alcohols, amines, and combinations thereof, present in an amount of from about 0.1% by weight to about 100% by weight of the polyester resin.

3. The process according to claim 1, wherein the neutralizing agent is added in the form of an aqueous solution or solid selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the resin mixture to from about 5 to about 12.

4. The process according to claim 1, wherein the organic solvent is selected from the group consisting of isopropanol, methanol, ethanol, 1-butanol, 2-butanol, isobutanol, tert-butanol, and combinations thereof.

5. The process according to claim 1, wherein the at least one crystalline polyester resin comprises acidic groups with an acid number of from about 1 mg KOH/g polymer to about 200 mg KOH/g polymer.

6. The process according to claim 1, further comprising contacting the resin mixture with an optional colorant, an optional wax, and an amorphous polyester resin to form a shell over the latex particles, wherein the shell is present in an amount of from about 1% by weight to about 80% by weight of the particles.

7. The process according to claim 1, wherein the latex particles have a low coarse content of from about 0.01% to about 5%; a solids content of from about 10% to about 50%, and a particle size of from about 10 nm to about 500 nm.

8. The process according to claim 1, further comprising recovering the organic solvent by separating the organic solvent from the de-ionized water and utilizing recycled organic solvent in a subsequent emulsification process.

9. A process comprising:
    contacting at least one crystalline polyester resin with an organic solvent to form a resin mixture, wherein the organic solvent is selected from the group consisting of isopropanol, methanol, ethanol, 1-butanol, 2-butanol, isobutanol, tert-butanol, and combinations thereof and wherein the organic solvent to resin ratio is from about 0.1:10 to about 20:10;
    melt mixing the mixture;
    contacting the melt mixed mixture with a neutralizing agent;
    contacting the neutralized mixture with de-ionized water to form an emulsion;
    continuously recovering latex particles from the emulsion;
    contacting the latex particles with an optional colorant, an optional wax, and an amorphous polyester resin to form toner particles.

10. The process according to claim 9, further comprising recovering the organic solvent from the resin mixture by separating the organic solvent from the de-ionized water and utilizing recycled organic solvent in a subsequent emulsification process.

11. The process according to claim 9, wherein the organic solvent is isopropanol present in an amount of from about 1% by weight to about 99% by weight; and wherein the neutralizing agent is added in the form of an aqueous solution selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the resin mixture to from about 5 to about 12.

12. The process according to claim 9, wherein the at least one crystalline polyester resin comprises acidic groups with an acid number of from about 1 to about 200 mg KOH/g polymer.

13. The process according to claim 9, wherein the amorphous polyester resin forms a shell over the latex particles and is present in an amount of from about 1% by weight to about 80% by weight of the particles.

14. The process according to claim 9, wherein the latex particles have a solids content of from about 10% to about 50%, and wherein the latex particles have a particle size of from about 10 nm to about 500 nm.

15. A process comprising:
    contacting at least one crystalline polyester resin with an organic solvent to form a resin mixture, wherein the organic solvent is selected from the group consisting of isopropanol, methanol, ethanol, 1-butanol, 2-butanol, isobutanol, tert-butanol, and combinations thereof;

contacting at least one crystalline polyester resin with a recycled organic solvent from a previous emulsification process to form a resin mixture, wherein the organic solvent to resin ratio is from about 0.1:10 to about 20:10;

melt mixing the mixture;

contacting the melt mixed mixture with a neutralizing agent;

contacting the neutralized mixture with de-ionized water to form an emulsion;

recovering the organic solvent from the resin mixture;

continuously recovering latex particles from the emulsion; and contacting the latex particles with an optional colorant, an optional wax, an optional additive, and an amorphous polyester resin to form toner particles.

16. A process according to claim 15, wherein the organic solvent is a recycled organic solvent from a previous emulsification process present in an amount of from about 1% by weight to about 99% by weight of the polyester resin.

17. The process according to claim 15, wherein the neutralizing agent is added in the form of an aqueous solution selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the resin mixture to from about 5 to about 12.

18. The process according to claim 15, wherein the at least one crystalline polyester resin is utilized in amounts of from about 1 weight % to about 90 weight %.

19. The process according to claim 15, wherein the colorant is selected from the group consisting of dyes, pigments, mixtures of dyes, mixtures of pigments, mixtures of dyes and pigments, and the like, and is present in amounts of from about 0.1% by weight to about 35% by weight of the toner; and wherein the additives are selected from the group consisting of titanium oxide, silicon oxide, aluminum oxides, cerium oxides, tin oxide, colloidal and amorphous silicas, zinc stearate, calcium stearate, alkyl pyridinium halides, bisulfates, alkyl pyridinium compounds, organic sulfates, organic sulfonates, cetyl pyridinium tetrafluoroborates, distearyl dimethyl ammonium methyl sulfate, aluminum salts, and combinations thereof.

20. The process according to claim 15, wherein the toner particles have a size of from about 2 um to about 12 um.

\* \* \* \* \*